US012589381B2

(12) United States Patent
Sato

(10) Patent No.: US 12,589,381 B2
(45) Date of Patent: Mar. 31, 2026

(54) HYDROCARBON REFORMING CATALYST AND HYDROCARBON REFORMING APPARATUS

(71) Applicant: Murata Manufacturing Co., Ltd., Nagaokakyo (JP)

(72) Inventor: Hideto Sato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 576 days.

(21) Appl. No.: 17/849,912

(22) Filed: Jun. 27, 2022

(65) Prior Publication Data

US 2022/0331779 A1 Oct. 20, 2022

Related U.S. Application Data

(63) Continuation of application No. PCT/JP2020/041152, filed on Nov. 4, 2020.

(30) Foreign Application Priority Data

Jan. 7, 2020 (JP) ................................. 2020-000916

(51) Int. Cl.
*B01J 23/00* (2006.01)
*B01J 23/46* (2006.01)
(Continued)

(52) U.S. Cl.
CPC ........... *B01J 23/002* (2013.01); *B01J 23/462* (2013.01); *B01J 35/40* (2024.01); *C01B 3/40* (2013.01);
(Continued)

(58) Field of Classification Search
CPC ...... B01J 23/002; B01J 23/456; B01J 21/066; B01J 23/02; B01J 23/10; B01J 23/462; B01J 23/58; B01J 23/63; C01B 3/40
See application file for complete search history.

(56) References Cited

U.S. PATENT DOCUMENTS 8,241,600 B1 * 8/2012 Berry ...................... C01B 3/326
423/652
10,308,565 B2 * 6/2019 Schammel ............... B01J 37/03
(Continued)

FOREIGN PATENT DOCUMENTS

AU 6182199 A 4/2000
JP S63302950 A 12/1988
(Continued)

OTHER PUBLICATIONS

Enhanced Methane Reforming Activity of a Hydrothermally Synthesized Codoped Perovskite Catalyst Majida H. Khazaal, John Z. Staniforth, Zainab A. Alfatlawi, R. Mark Ormerod, and Richard. J. Darton Energy & Fuels 2018 32 (12), 12826-12832 DOI: 10.1021/acs.energyfuels.8b02848 (Year: 2018).*
(Continued)

*Primary Examiner* — Anthony J Zimmer
*Assistant Examiner* — Annette Phan
(74) *Attorney, Agent, or Firm* — ArentFox Schiff LLP

(57) ABSTRACT
A hydrocarbon reforming catalyst used for forming a synthetic gas containing hydrogen and carbon monoxide from a hydrocarbon-based gas, the hydrocarbon reforming catalyst containing a complex oxide having a perovskite structure, wherein the complex oxide has a crystal phase containing $SrZrO_3$ as a primary component and contains Ru.

13 Claims, 2 Drawing Sheets

(51) Int. Cl.
    *B01J 35/40*       (2024.01)
    *C01B 3/40*       (2006.01)

(52) U.S. Cl.
    CPC ........ *B01J 2523/24* (2013.01); *B01J 2523/36*
        (2013.01); *B01J 2523/3712* (2013.01); *B01J*
      *2523/48* (2013.01); *C01B 2203/0233* (2013.01)

(56)         References Cited

U.S. PATENT DOCUMENTS

| 10,865,166 | B2 * | 12/2020 | Schammel | B01J 23/34 |
| 2004/0242413 | A1 | 12/2004 | Sakon et al. | |
| 2005/0255993 | A1 * | 11/2005 | Tanaka | B01J 23/688 |
| | | | | 502/302 |
| 2006/0157674 | A1 * | 7/2006 | Matsumoto | C01B 3/503 |
| | | | | 252/500 |
| 2009/0269264 | A1 * | 10/2009 | Saito | B01J 37/04 |
| | | | | 423/230 |
| 2012/0161078 | A1 | 6/2012 | Saito et al. | |
| 2022/0331779 | A1 * | 10/2022 | Sato | B01J 37/0009 |

FOREIGN PATENT DOCUMENTS

| JP | H06315634 A | 11/1994 |
| JP | H0780310 A | 3/1995 |
| JP | H08231204 A | 9/1996 |
| JP | H09168740 A | 6/1997 |
| JP | 2002346341 A | 12/2002 |
| JP | 2003190792 A | 7/2003 |
| JP | 2006346598 A | 12/2006 |
| JP | 2013237049 A | 11/2013 |
| JP | 2015136668 A | 7/2015 |
| WO | 2011027727 A1 | 3/2011 |

OTHER PUBLICATIONS

Facile Synthesis of Ruthenium Decorated Zr0.5Ce0.5O2 Nanorods for Catalytic Partial Oxidation of Methane Subhasis Das, Rishi Gupta, Ashok Kumar, Mumtaj Shah, Manideepa Sengupta, Sahil Bhandari, and Ankur Bordoloi ACS Applied Nano Materials 2018 1 (6), 2953-2961 DOI: 10.1021/acsanm.8b00567 (Year: 2018).*

International Search Report in PCT/JP2020/041152, mailed Dec. 28, 2020, 3 pages.

Khazaal, "Enhanced reforming of methane to synthesis gas by co-doped perovskite catalysts," Doctor of Philosophy, Keele University, Mar. 30, 2019, pp. 1-258.

Ruocco et al., "Methane dry reforming on Ru perovskites, AZr-RuO3: Influence of preparation method and substitution of a cation with alkaline earth metals," Journal of CO2 Utilization, Mar. 1, 2019, vol. 30, pp. 222-231.

* cited by examiner

HYDROCARBON REFORMING CATALYST AND HYDROCARBON REFORMING APPARATUS

CROSS REFERENCE TO RELATED APPLICATIONS

The present application is a continuation of International application No. PCT/JP2020/041152, filed Nov. 4, 2020, which claims priority to Japanese Patent Application No. 2020-000916, filed Jan. 7, 2020, the entire contents of each of which are incorporated herein by reference.

FIELD OF THE INVENTION

The present invention relates to a hydrocarbon reforming catalyst used for forming a synthetic gas containing hydrogen and carbon monoxide from a hydrocarbon-based gas and to a hydrocarbon reforming apparatus including the hydrocarbon reforming catalyst.

BACKGROUND OF THE INVENTION

In a known method, a synthetic gas containing hydrogen and carbon monoxide is obtained from a hydrocarbon-based gas by using a catalyst. Examples of the known catalyst used for a reforming reaction of the hydrocarbon-based gas include nickel-based catalysts in which nickel is supported by a base substrate such as alumina, ruthenium-based catalysts in which ruthenium is supported (refer to Patent Document 1), and rhodium-based catalysts in which rhodium is supported by a base substrate such as alumina (refer to Patent Document 2).

Further, in known catalysts, rhodium, cobalt, or nickel serving as an active component is supported by a carrier including lanthanum aluminate, strontium titanate, or barium titanate, which are perovskite-type compounds, to suppress carbon from depositing and to improve the activity at low temperature (refer to Patent Document 3).

As a common method for producing a metal-supporting catalyst, an impregnation method in which an active metal is dispersed on the carrier surface by dipping an oxide serving as a carrier into a solution of a metal salt or the like and, thereafter, performing heat treatment is known (Patent Document 1 to Patent Document 3).

In this regard, the carrier component is required to have high heat stability and strength and, therefore, is sufficiently sintered by being subjected to heat treatment at high temperature, while the dispersibility of the supported metal has to be maintained to obtain high activity. Consequently, to minimize aggregation during a heat treatment step, the supported metal is fixed to the carrier under a heat treatment condition at relatively low temperature by using a production step different from the synthesis of the carrier, as in the impregnation method.

The catalyst produced by the impregnation method can maintain high metal dispersibility. However, the impregnation step of supporting the metal component is necessary in addition to the carrier component synthesis step. Further, since the metal component is made to adhere by heat treatment at relatively low temperature, coupling between the metal and the carrier is weak, carbon deposition may cause an activity deterioration problem.

Consequently, as a method for producing a catalyst without using the impregnation step, a method in which a complex oxide containing $BaNiY_2O_5$ is synthesized through solid-phase synthesis so as to improve the dispersibility of a Ni component is proposed (Patent Document 4).

Patent Document 1: Japanese Unexamined Patent Application Publication No. 8-231204
Patent Document 2: Japanese Unexamined Patent Application Publication No. 9-168740
Patent Document 3: Japanese Unexamined Patent Application Publication No. 2006-346598
Patent Document 4: Japanese Unexamined Patent Application Publication No. 2015-136668

SUMMARY OF THE INVENTION

The catalyst described in Patent Document 4 can suppress carbon from depositing. However, it cannot be said that the activity is sufficiently high, and there is room for improvement.

The present invention addresses the above-described problem, and it is an object to provide a hydrocarbon reforming catalyst having high activity and to provide a hydrocarbon reforming apparatus including such a hydrocarbon reforming catalyst.

A hydrocarbon reforming catalyst according to the present invention is a catalyst used for forming a synthetic gas containing hydrogen and carbon monoxide from a hydrocarbon-based gas, and the hydrocarbon reforming catalyst contains a complex oxide having a perovskite structure, wherein the complex oxide has a first crystal phase containing $SrZrO_3$ as a primary component and contains Ru.

According to the present invention, a hydrocarbon reforming catalyst having high activity and a hydrocarbon reforming apparatus including such a hydrocarbon reforming catalyst can be provided.

DETAILED DESCRIPTION OF THE PREFERRED EMBODIMENTS

An embodiment according to the present invention will be illustrated below so as to specifically describe the features of the present invention.

The hydrocarbon reforming catalyst according to the present invention is a catalyst used for forming a synthetic gas containing hydrogen and carbon monoxide from a hydrocarbon-based gas and contains a complex oxide having a perovskite structure, wherein the complex oxide has a crystal phase containing $SrZrO_3$ as a primary component and contains Ru.

For example, a propane gas containing propane as a primary component or a natural gas containing methane as a primary component may be used as the hydrocarbon-based gas that is a treatment object gas. In addition, hydrocarbon-based gases obtained by vaporizing liquid hydrocarbons, such as gasoline, kerosene, methanol, and ethanol, may also be used.

The reaction which forms a synthetic gas containing hydrogen and carbon monoxide from a hydrocarbon-based gas will be described with reference to steam reforming of a propane gas as an example. The steam reforming of a propane gas is represented by formula (1) below.

$$C_3H_8 + 3H_2O \rightarrow 7H_2 + 3CO \qquad (1)$$

In this regard, the method for forming a synthetic gas containing hydrogen and carbon monoxide from a hydrocarbon-based gas is not limited to steam reforming. For example, oxygen, carbon dioxide, or a mixture thereof may be contained instead of steam. When carbon dioxide is contained, the reforming reaction is represented by formula (2) below.

$$C_3H_8+3CO_2 \rightarrow 4H_2+6CO \qquad (2)$$

Figure 1:
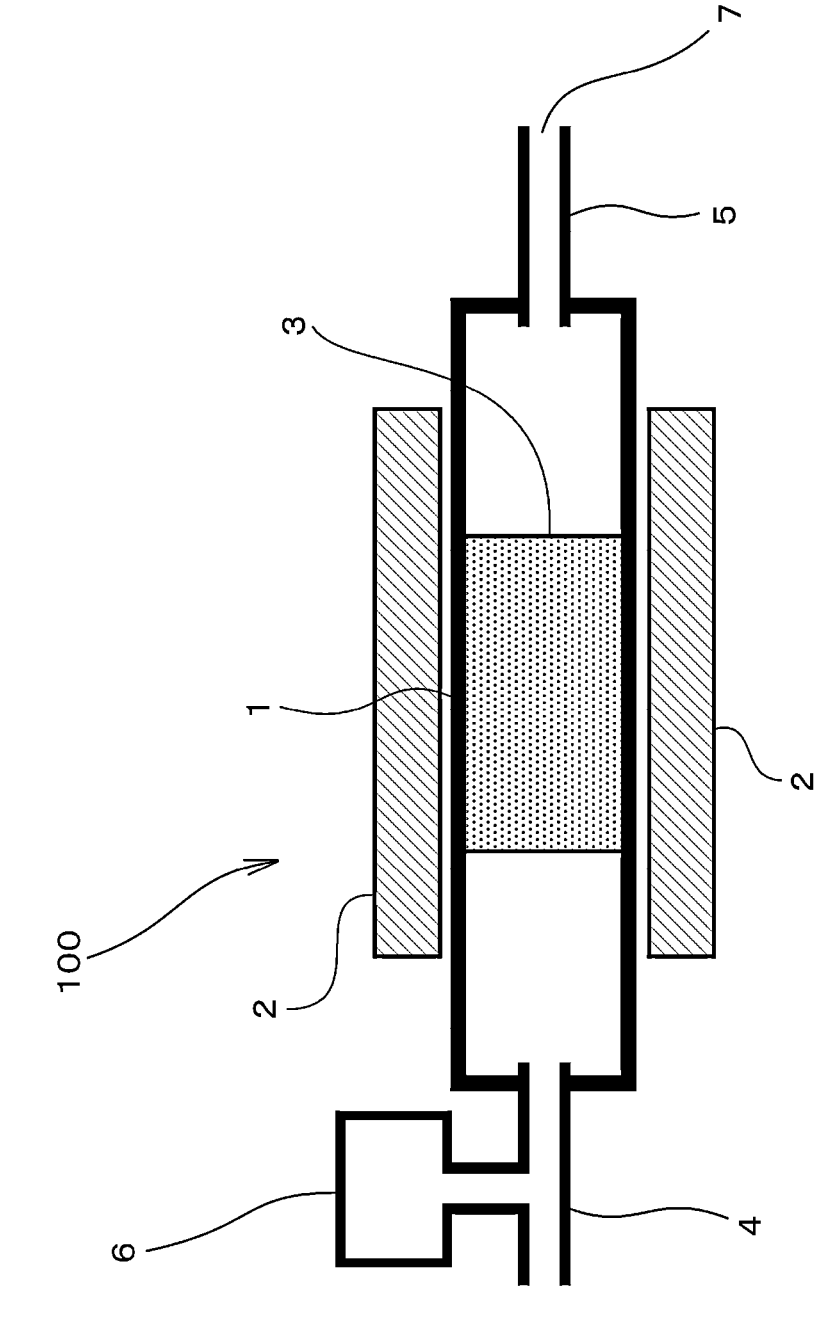
FIG. 1 is a diagram illustrating the outline of the configuration of a hydrocarbon reforming apparatus.

FIG. 1 is a diagram illustrating the outline of the configuration of a hydrocarbon reforming apparatus 100 to form a synthetic gas containing hydrogen and carbon monoxide from a treatment object gas containing at least a hydrocarbon. The hydrocarbon reforming apparatus 100 includes a pipe 1 through which the treatment object gas passes, a heating portion 2 to heat the treatment object gas passing through the pipe 1, and a hydrocarbon reforming catalyst 3 disposed at a position to contact the treatment object gas inside the pipe 1. The hydrocarbon reforming catalyst 3 is a catalyst that contains a complex oxide having a perovskite structure, and the complex oxide has a crystal phase containing $SrZrO_3$ as a primary component and containing Ru. In this regard, when just the treatment object gas is at sufficiently high temperature, the heating portion 2 may be skipped.

A gas feed pipe 4 is coupled to the upstream side of the pipe 1. A hydrocarbon is fed from a hydrocarbon supply source 6 to the gas feed pipe 4. However, the hydrocarbon supply source 6 may be disposed at the former stage of the gas feed pipe 4. In this regard, the hydrocarbon fed from the hydrocarbon supply source 6 may contain other components.

A gas discharge pipe 5 to discharge a synthetic gas containing hydrogen and carbon monoxide obtained through reforming is coupled to the downstream side of the pipe 1. The gas discharge pipe 5 is provided with a hydrogen outlet 7 and is configured to be capable of separating hydrogen contained in the synthetic gas. For example, a CO converter may be disposed in the gas discharge pipe 5 so as to remove carbon monoxide contained in the synthetic gas, and hydrogen may be separated through the hydrogen outlet 7.

EXAMPLES 1 TO 4

$SrCO_3$, $ZrO_2$, $CeO_2$, and $RuO_2$ were prepared as the materials for forming the hydrocarbon reforming catalyst and weighed so that the molar ratio of Sr:Zr:Ce:Ru was set to be equal to the ratio described in Table 1, and pebbles, water, and a binder were wet-mixed so as to obtain a mixture. The resulting mixture was dried in an oven at a temperature of 120° C. and was pulverized and classified so as to have a granular shape with the size of about 2 mm. Thereafter, hydrocarbon reforming catalysts of examples 1 to 4 were obtained by firing the granular sample in air under the conditions of 1,000° C. and 1 hour.

As described in Table 1, the hydrocarbon reforming catalysts of examples 1 to 4 contained Sr, Zr, Ce, and Ru. The molar ratios of Zr to Sr and molar ratios of Ce to Sr of the hydrocarbon reforming catalysts of examples 1 to 4 were equal to each other, but the molar ratios of Ru to Sr differed from each other.

EXAMPLES 5 TO 7

Regarding the material for forming the hydrocarbon reforming catalyst, $SrCO_3$, $ZrO_2$, $CeO_2$, $Y_2O_3$, and $RuO_2$ were prepared and weighed so that the molar ratio of Sr:Zr:Ce:Y:Ru was set to be equal to the ratio described in Table 1, and pebbles, water, and a binder were wet-mixed so as to obtain a mixture. Thereafter, hydrocarbon reforming catalysts of examples 5 to 7 were produced by using the same method as the method for producing the hydrocarbon reforming catalysts of examples 1 to 4.

As described in Table 1, the hydrocarbon reforming catalysts of examples 5 to 7 contained Sr, Zr, Ce, Y, and Ru. The molar ratios of Ru to Sr of the hydrocarbon reforming catalysts of examples 5 to 7 were substantially equal to each other, but the molar ratios of Zr, Ce, and Y differed from each other.

EXAMPLES 8 TO 11

Regarding the material for forming the hydrocarbon reforming catalyst, $SrCO_3$, $ZrO_2$, $CeO_2$, and $RuO_2$ were prepared and weighed so that the molar ratio of Sr:Zr:Ce:Ru was set to be equal to the ratio described in Table 1, and pebbles, water, and a binder were wet-mixed so as to obtain a mixture. Thereafter, hydrocarbon reforming catalysts of examples 8 to 11 were produced by using the same method as the method for producing the hydrocarbon reforming catalysts of examples 1 to 4.

As described in Table 1, the hydrocarbon reforming catalysts of examples 8 to 11 contained Sr, Zr, Ce, and Ru but did not contain Y in the manner akin to the manner of the hydrocarbon reforming catalysts of examples 1 to 4. The molar ratios of Ru to Sr of the hydrocarbon reforming catalysts of examples 8 to 11 were substantially equal to each other, but the molar ratios of Zr and Ce differed from each other.

EXAMPLES 12 TO 14

Regarding the material for forming the hydrocarbon reforming catalyst, $SrCO_3$, $ZrO_2$, $Y_2O_3$, and $RuO_2$ were prepared and weighed so that the molar ratio of Sr:Zr:Y:Ru was set to be equal to the ratio described in Table 1, and pebbles, water, and a binder were wet-mixed so as to obtain a mixture. Thereafter, hydrocarbon reforming catalysts of examples 12 to 14 were produced by using the same method as the method for producing the hydrocarbon reforming catalysts of examples 1 to 4.

As described in Table 1, the hydrocarbon reforming catalysts of examples 12 to 14 contained Sr, Zr, Y, and Ru but did not contain Ce. The molar ratios of Ru to Sr of the hydrocarbon reforming catalysts of examples 12 to 14 were equal to each other, but the molar ratios of Zr and Y differed from each other.

EXAMPLE 15

Regarding the material for forming the hydrocarbon reforming catalyst, $SrCO_3$, $ZrO_2$, and $RuO_2$ were prepared and weighed so that the molar ratio of Sr:Zr:Ru was set to be equal to the ratio described in Table 1, and pebbles, water, and a binder were wet-mixed so as to obtain a mixture. Thereafter, a hydrocarbon reforming catalyst of example 15 was produced by using the same method as the method for producing the hydrocarbon reforming catalysts of examples 1 to 4.

As described in Table 1, the hydrocarbon reforming catalyst of example 15 contained Sr, Zr, and Ru but contained neither Ce nor Y.

COMPARATIVE EXAMPLES 1 AND 2

Regarding the material for forming the hydrocarbon reforming catalyst, $SrCO_3$, $CeO_2$, $Y_2O_3$, and $RuO_2$ were prepared and weighed so that the molar ratio of Sr:Ce:Y:Ru was set to be equal to the ratio described in Table 1, and pebbles, water, and a binder were wet-mixed so as to obtain a mixture. Thereafter, hydrocarbon reforming catalysts of comparative examples 1 and 2 were produced by using the same method as the method for producing the hydrocarbon reforming catalysts of examples 1 to 4.

The hydrocarbon reforming catalysts of comparative examples 1 and 2 were catalysts not satisfying the requirements of the present invention. As described in Table 1, the hydrocarbon reforming catalysts of comparative examples 1 and 2 contained Sr, Ce, Y, and Ru but did not contain Zr.

COMPARATIVE EXAMPLE 3

Regarding the material for forming the hydrocarbon reforming catalyst, $SrCO_3$, $CeO_2$, and $RuO_2$ were prepared and weighed so that the molar ratio of Sr:Ce:Ru was set to be equal to the ratio described in Table 1, and pebbles, water, and a binder were wet-mixed so as to obtain a mixture. Thereafter, a hydrocarbon reforming catalyst of comparative example 3 was produced by using the same method as the method for producing the hydrocarbon reforming catalysts of examples 1 to 4.

The hydrocarbon reforming catalyst of comparative example 3 was a catalyst not satisfying the requirements of the present invention. As described in Table 1, the hydrocarbon reforming catalyst of comparative example 3 contained Sr, Ce, and Ru but contained neither Zr nor Y.

COMPARATIVE EXAMPLE 4

Regarding the material for forming the hydrocarbon reforming catalyst, $SrCO_3$, $ZrO_2$, and $RuO_2$ were prepared hydrocarbon reforming catalyst of example 15. Thereafter, a hydrocarbon reforming catalyst of comparative example 4 was produced by using the same method as the method for producing the hydrocarbon reforming catalyst of example 15 except that the firing temperature was set to be 600° C. The hydrocarbon reforming catalyst of comparative example 4 was a catalyst not satisfying the requirements of the present invention.

COMPARATIVE EXAMPLE 5

Regarding the material for forming the hydrocarbon reforming catalyst, $SrCO_3$, $ZrO_2$, $CeO_2$, and $RuO_2$ were prepared and weighed so that the molar ratio of Sr:Zr:Ce:Ru was set to be equal to the ratio described in Table 1, and pebbles, water, and a binder were wet-mixed so as to obtain a mixture. The molar ratio of Sr:Zr:Ce:Ru in the resulting mixture was equal to the molar ratio of Sr:Zr:Ce:Ru of the materials used for producing the hydrocarbon reforming catalyst of example 10. Thereafter, a hydrocarbon reforming catalyst of comparative example 5 was produced by using the same method as the method for producing the hydrocarbon reforming catalyst of example 10 except that the firing temperature was set to be 600° C. The hydrocarbon reforming catalyst of comparative example 5 was a catalyst not satisfying the requirements of the present invention.

\<Examination of Crystal Phase\>

The hydrocarbon reforming catalysts of examples 1 to 15 and comparative examples 1 to 5 above were pulverized by using a mortar, and the crystal phase was examined by powder XRD measurement. Regarding the powder XRD measurement, Cu-Kα1 was used as the X-ray.

Table 1 describes the crystal phase and the composition (molar ratio) examined with respect to the hydrocarbon reforming catalysts of examples 1 to 15 and comparative examples 1 to 5.

TABLE 1

| Catalyst | Crystal phase | Molar ratio | | | | |
| --- | --- | --- | --- | --- | --- | --- |
| | | Sr | Zr | Ce | Y | Ru |
| Example 1 | $SrZrO_3$, $SrCeO_3$ | 1.00 | 0.50 | 0.50 | — | 0.01 |
| Example 2 | $SrZrO_3$, $SrCeO_3$ | 1.00 | 0.50 | 0.50 | — | 0.04 |
| Example 3 | $SrZrO_3$, $SrCeO_3$, $SrCO_3$ | 1.00 | 0.50 | 0.50 | — | 0.19 |
| Example 4 | $SrZrO_3$, $SrCeO_3$, $SrCO_3$ | 1.00 | 0.50 | 0.50 | — | 0.38 |
| Example 5 | $SrZrO_3$, $SrCeO_3$, $Y_2O_3$, $SrCO_3$ | 1.00 | 0.40 | 0.30 | 0.30 | 0.07 |
| Example 6 | $SrZrO_3$, $SrCeO_3$ | 1.00 | 0.40 | 0.50 | 0.10 | 0.08 |
| Example 7 | $SrZrO_3$, $SrCeO_3$, $Y_2O_3$, $SrCO_3$ | 1.00 | 0.20 | 0.50 | 0.30 | 0.07 |
| Example 8 | $SrZrO_3$, $SrCeO_3$ | 1.00 | 0.90 | 0.10 | — | 0.07 |
| Example 9 | $SrZrO_3$, $SrCeO_3$, $SrCO_3$ | 1.00 | 0.70 | 0.30 | — | 0.07 |
| Example 10 | $SrZrO_3$, $SrCeO_3$, $SrCO_3$ | 1.00 | 0.50 | 0.50 | — | 0.08 |
| Example 11 | $SrZrO_3$, $SrCeO_3$ | 1.00 | 0.20 | 0.80 | — | 0.08 |
| Example 12 | $SrZrO_3$ | 1.00 | 0.90 | — | 0.10 | 0.07 |
| Example 13 | $SrZrO_3$, $SrCeO_3$ | 1.00 | 0.70 | — | 0.30 | 0.07 |
| Example 14 | $SrZrO_3$, $Y_2O_3$, $SrCO_3$ | 1.00 | 0.50 | — | 0.50 | 0.07 |
| Example 15 | $SrZrO_3$ | 1.00 | 1.00 | — | — | 0.07 |
| Comparative example 1 | $SrCeO_3$ | 1.00 | — | 0.80 | 0.20 | 0.08 |
| Comparative example 2 | $SrCeO_3$, $Y_2O_3$, $SrCO_3$ | 1.00 | — | 0.50 | 0.50 | 0.07 |
| Comparative example 3 | $SrCeO_3$ | 1.00 | — | 1.00 | — | 0.08 |
| Comparative example 4 | $SrCO_3$, $ZrO_2$, $RuO_2$ | 1.00 | 1.00 | — | — | 0.07 |
| Comparative example 5 | $SrCO_3$, $ZrO_2$, $CeO_2$ $RuO_2$ | 1.00 | 0.50 | 0.50 | — | 0.08 | and weighed so that the molar ratio of Sr:Zr:Ru was set to be equal to the ratio described in Table 1, and pebbles, water, and a binder were wet-mixed so as to obtain a mixture. The molar ratio of Sr:Zr:Ru in the resulting mixture was equal to the molar ratio of the materials used for producing the Regarding the hydrocarbon reforming catalysts of examples 1 to 15, it was ascertained that a crystal phase of a complex oxide having a perovskite structure, specifically, at least a crystal phase containing $SrZrO_3$ as a primary component was present. Further specifically, regarding the hydrocarbon reforming catalysts of examples 1 to 11, it was ascertained that a crystal phase containing $SrZrO_3$ as a primary component and a crystal phase containing $SrCeO_3$ as a primary component were present. In addition, regarding the hydrocarbon reforming catalysts of examples 12 to 15, it was ascertained that a crystal phase containing $SrZrO_3$ as a primary component was present.

Regarding hydrocarbon reforming catalysts of some examples, heterogeneous phases such as $SrCO_3$ and $Y_2O_3$ were also observed in accordance with the composition ratio. However, even in these hydrocarbon reforming catalysts, the main crystal phase of the complex oxide having a perovskite structure was a crystal phase containing $SrZrO_3$ as a primary component when a crystal phase containing $SrCeO_3$ as a primary component was not contained and was a crystal phase containing $SrZrO_3$ as a primary component and a crystal phase containing $SrCeO_3$ as a primary component when a crystal phase containing $SrCeO_3$ as a primary component was contained.

Figure 2:
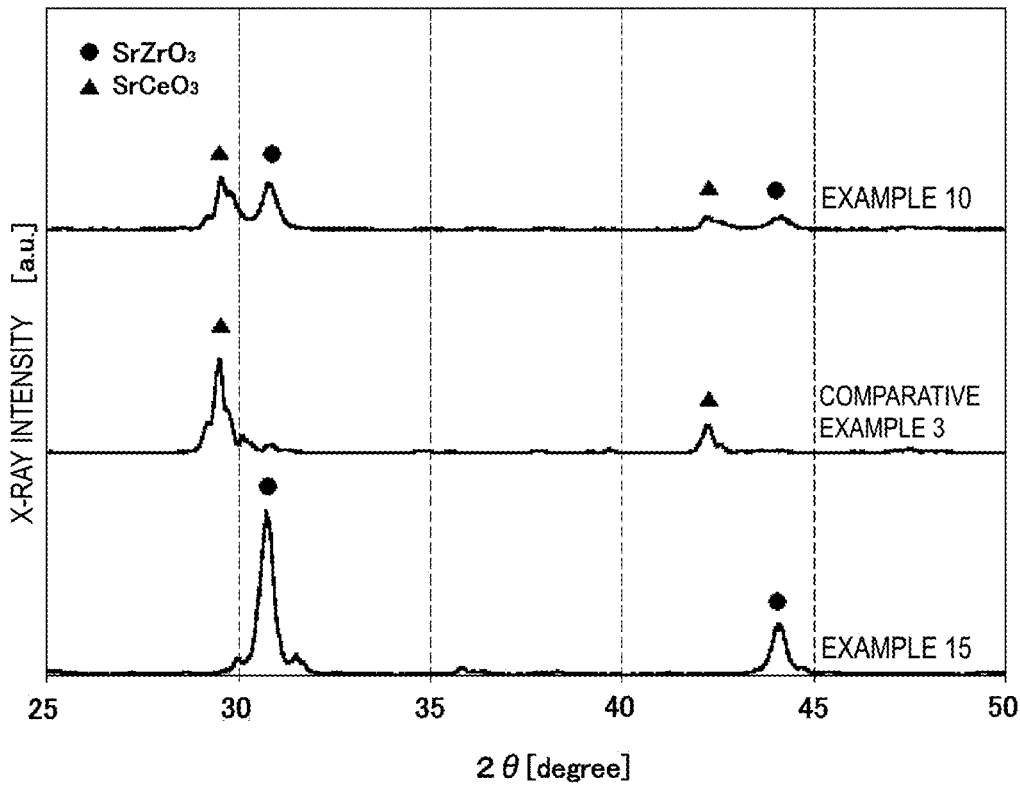
FIG. 2 is a diagram illustrating X-ray diffraction patterns of the hydrocarbon reforming catalysts of examples 10 and 15 and comparative example 3.

FIG. 2 illustrates X-ray diffraction patterns of the hydrocarbon reforming catalysts of examples 10 and 15 and comparative example 3. As illustrated in FIG. 2, it can be ascertained that a crystal phase attributed to $SrZrO_3$ and a crystal phase attributed to $SrCeO_3$ are present in the hydrocarbon reforming catalyst of example 10. In addition, it can be ascertained that a crystal phase attributed to $SrZrO_3$ is present in the hydrocarbon reforming catalyst of example 15, and it can be ascertained that a crystal phase attributed to $SrCeO_3$ is present in the hydrocarbon reforming catalyst of comparative example 3. On the other hand, no diffraction lines attributed to $RuO_2$ and Ru simple substance are observed regarding these hydrocarbon reforming catalysts.

That is, in the hydrocarbon reforming catalyst of example 10, Ru is present in at least one structure of a crystal phase containing $SrZrO_3$ as a primary component and a crystal phase containing $SrCeO_3$ as a primary component. In addition, in the hydrocarbon reforming catalyst of example 15, Ru is present in the structure of a crystal phase containing $SrZrO_3$ as a primary component. Further, in the hydrocarbon reforming catalyst of comparative example 3, Ru is present in the structure of a crystal phase containing $SrCeO_3$ as a primary component. In other words, Ru is present as a component constituting a complex oxide having a perovskite structure.

Likewise, Ru is present as a component constituting a complex oxide having a perovskite structure in the hydrocarbon reforming catalysts of examples 1 to 4, 8, 9, 11, and 15. Regarding the hydrocarbon reforming catalysts of examples 5 to 7 and 12 to 14 in which Y and Ru are contained in a complex oxide, each of Y and Ru is present as a component constituting the complex oxide having a perovskite structure.

On the other hand, it was ascertained that the hydrocarbon reforming catalyst of comparative example 4 was a mixture of $SrCO_3$, $ZrO_2$, and $RuO_2$ which were used for preparation since the firing temperature during production was 600° C. which was lower than the formation temperature of the complex oxide having a perovskite structure. Likewise, it was ascertained that the hydrocarbon reforming catalyst of comparative example 5 was also a mixture of $SrCO_3$, $ZrO_2$, $CeO_2$, and $RuO_2$ which were used for preparation.

<Examination of Composition>

Each of the hydrocarbon reforming catalysts of examples 1 to 15 and the hydrocarbon reforming catalysts of comparative examples 1 to 5 was finely pulverized by using a mortar, and the resulting powder was subjected to composition analysis by X-ray fluorescence analysis (XRF analysis). As a result, it was ascertained that regarding all the hydrocarbon reforming catalysts subjected to the composition analysis, the element molar ratio of the formulation for weighing was maintained and a change in the element molar ratio, such as reduction in each component due to heating and firing treatment, did not occur.

In this regard, in the hydrocarbon reforming catalysts of examples 1 to 15, the molar ratio of Ru to Sr was 0.01 to 0.38.

<Evaluation of Reforming>

The hydrocarbon reforming catalyst of each of examples 1 to 15 and comparative examples 1 to 5 was pulverized and classified into the size of 0.5 mm to 0.7 mm. Thereafter, a steam reforming evaluation test of a propane gas was performed by using the following method.

The pipe 1 of the hydrocarbon reforming apparatus 100 illustrated in FIG. 1 was filled with 0.3 g of hydrocarbon reforming catalyst produced by using the above-described method, and heating at 600° C. was performed in the heating portion 2. Subsequently, a raw material gas was introduced from the gas feed pipe 4 at a flow rate of nitrogen ($N_2$) of 350 cc/min, propane ($C_3H_8$) of 7 cc/min, steam ($H_2O$) of 60 cc/min, and carbon dioxide ($CO_2$) of 60 cc/min.

The raw material gas introduced into the pipe 1 was reformed, and a synthetic gas containing hydrogen and carbon monoxide was discharged from the gas discharge pipe 5. The synthetic gas discharged from the gas discharge pipe 5 was introduced into a gas analyzer (gas chromatograph) after moisture was removed by a cooling-type trap, and a hydrogen concentration was measured.

Herein, as a result of calculation of the equilibrium gas composition at the above-described conditions of the gas partial pressure and the temperature, the hydrogen gas concentration percentage in an equilibrium state was 8.1% by volume except for moisture. Therefore, when the reaction of the introduced raw material gas progresses 100%, the concentration of hydrogen in an equilibrium state (hereafter referred to as an equilibrium hydrogen concentration) discharged from the gas discharge pipe 5 is 8.1% by volume.

(I) Examination of Initial Activity

It was assumed that no sulfur component was present for the first 1 hour from introduction of the raw material gas, and the hydrogen concentration after 1 hour (initial hydrogen concentration) was measured so as to examine the initial activity of the hydrocarbon reforming catalyst. Table 2 describes the concentration of hydrogen discharged from the gas discharge pipe 5 (initial hydrogen concentration) and the equilibrium achievement percentage of the initial activity when the hydrocarbon reforming catalyst of each of the examples and the comparative examples was used. The equilibrium achievement percentage of the initial activity was defined by formula (3) below.

$$\text{equilibrium achievement percentage of initial activity} = \text{initial hydrogen concentration/equilibrium hydrogen concentration} \times 100 \qquad (3)$$

(II) Examination of Characteristics after Deterioration Due to Sulfur

After the above-described initial activity was examined, a $SO_2$ gas was mixed so that the proportion was set to be 10 ppm relative to the total flow rate of the raw material gas of 477 cc/min, the hydrogen gas concentration after 1 hour was measured so as to examine deterioration in the catalyst activity in the presence of sulfur. Table 2 describes the concentration of hydrogen discharged from the gas discharge pipe 5 after 1 hour in the presence of sulfur and the equilibrium achievement percentage when the hydrocarbon reforming catalyst of each of the examples and the comparative examples was used. In Table 2, these are expressed as the hydrogen concentration "After deterioration due to sulfur" and "Equilibrium achievement percentage after deterioration due to sulfur". The equilibrium achievement percentage after deterioration due to sulfur was defined by formula (4) below.

equilibrium achievement percentage after deterioration due to sulfur=hydrogen concentration after deterioration due to sulfur/equilibrium hydrogen concentration×100     (4)

After the test was completed, to examine presence or absence of carbon deposition, the hydrocarbon reforming catalyst was cooled and removed in a $N_2$ atmosphere, and a change in the weight of the catalyst due to carbon combustion was examined by TG-DTA (thermogravimetric-differential thermal analysis). As a result, regarding all the hydrocarbon reforming catalysts of the examples and comparative examples subjected to the evaluation, carbon deposition was not observed.

TABLE 2

| Catalyst | Hydrogen concentration (% by volume) | | Equilibrium achievement percentage of initial activity | Equilibrium achievement percentage after deterioration due to sulfur |
| | Initial stage | After deterioration due to sulfur | | |
|---|---|---|---|---|
| Example 1 | 3.8 | 2.8 | 47% | 35% |
| Example 2 | 5.8 | 4.2 | 72% | 52% |
| Example 3 | 8.1 | 8.1 | 100% | 100% |
| Example 4 | 8.1 | 8.1 | 100% | 100% |
| Example 5 | 2.3 | 1.8 | 29% | 23% |
| Example 6 | 5.9 | 3.8 | 72% | 47% |
| Example 7 | 7.6 | 5.5 | 94% | 68% |
| Example 8 | 7.2 | 4.4 | 89% | 54% |
| Example 9 | 7.8 | 5.9 | 97% | 72% |
| Example 10 | 8.1 | 7.1 | 100% | 87% |
| Example 11 | 8.0 | 2.7 | 98% | 34% |
| Example 12 | 7.5 | 4.2 | 93% | 52% |
| Example 13 | 6.7 | 6.1 | 83% | 75% |
| Example 14 | 5.0 | 3.0 | 62% | 37% |
| Example 15 | 7.3 | 1.3 | 90% | 16% |
| Comparative example 1 | 0.0 | 0.0 | 0% | 0% |
| Comparative example 2 | 0.5 | 0.1 | 6% | 1% |
| Comparative example 3 | 0.4 | 0.1 | 5% | 1% |
| Comparative example 4 | 1.8 | 0.0 | 22% | 0% |
| Comparative example 5 | 1.2 | 0.0 | 15% | 0% |

<Initial Activity>

As described in Table 2, when the hydrocarbon reforming catalysts of examples 1 to 15 were used, the equilibrium achievement percentage of the initial activity was a value higher than 22%, in particular, 29% or more. On the other hand, when the hydrocarbon reforming catalysts of comparative examples 1 to 5 not satisfying the requirements of the present invention were used, the equilibrium achievement percentage of the initial activity was 22% or less and was a low value.

The reason for the hydrocarbon reforming catalyst of the present invention having high initial activity is as described below. That is, it is conjectured that the hydrocarbon reforming catalyst is stabilized by the Ru component in a solid solution state being dispersed in the complex oxide having at least a crystal phase containing $SrZrO_3$ as a primary component and having a perovskite structure, aggregation and vaporization of the Ru component under a high-temperature oxidizing condition can be suppressed from occurring, and, as a result, the activity is improved.

In this regard, when the hydrocarbon reforming catalysts of examples 1 to 4 and 8 to 11, in which the complex oxide further had a crystal phase containing $SrCeO_3$ as a primary component but did not contain Y, were used, the equilibrium achievement percentage of the initial activity was 47% or more and was a high value. Therefore, it is favorable that the complex oxide further have a crystal phase containing $SrCeO_3$ as a primary component but not contain Y.

In addition, when the hydrocarbon reforming catalysts of examples 12 to 14, in which the complex oxide further contained Y but did not contain Ce, were used, the equilibrium achievement percentage of the initial activity was 62% or more and was a high value. Therefore, it is favorable that the complex oxide further contain Y but not contain Ce.

In addition, when the hydrocarbon reforming catalysts of examples 6 and 7, in which the complex oxide further had a crystal phase containing $SrCeO_3$ as a primary component and further contained Y at a molar ratio of Y to Ce of 0.6 or less, were used, the equilibrium achievement percentage of the initial activity was 72% or more and was a high value. Therefore, it is favorable that the complex oxide further have a crystal phase containing $SrCeO_3$ as a primary component and further contain Y at a molar ratio of Y to Ce of 0.6 or less.

<Sulfur Resistance>

As described in Table 2, when the hydrocarbon reforming catalysts of comparative examples 1 to 5 not satisfying the requirements of the present invention were used, the equilibrium achievement percentage after deterioration due to sulfur was 1% or less. On the other hand, when the hydrocarbon reforming catalysts of examples 1 to 15 were used, the equilibrium achievement percentage of the initial activity after deterioration due to sulfur was 16% or more. It is conjectured that regarding the hydrocarbon reforming catalysts of the present invention, since Ru component in a solid solution state is dispersed in the complex oxide, the bonding force is strong, an effect of suppressing a poisoning component such as sulfur from adsorbing or forming a compound is obtained, and high sulfur resistance is provided.

In this regard, when the hydrocarbon reforming catalysts of examples 1 to 14, in which the complex oxide further contained at least one of Ce and Y, were used, the equilibrium achievement percentage of the initial activity after deterioration due to sulfur was 23% or more and was a high value. Therefore, from the viewpoint of recovering the activity after deterioration due to sulfur, it is favorable that the complex oxide further contain at least one of Ce and Y.

The present invention is not limited to the above-described embodiment and can be variously applied and modified within the scope of the present invention.

For example, the hydrocarbon reforming catalysts of the above-described examples take on granular forms. However, similarly to the common metal-supporting catalyst, a hydrocarbon reforming catalyst made into a powder may be supported by a ceramic or metal base material and be used. Alternatively, a catalyst powder may be formed by a method of press molding, extrusion molding, or the like without using a base material and be used in the form of a pellet, a ring, a honeycomb, or the like.

REFERENCE SIGNS LIST

1: pipe
2: heating portion

3: hydrocarbon reforming catalyst
4: gas feed pipe
5: gas discharge pipe
6: hydrocarbon supply source
7: hydrogen outlet
100: hydrocarbon reforming apparatus

The invention claimed is:

1. A hydrocarbon reforming catalyst comprising:
a complex oxide having a perovskite structure,
   wherein the complex oxide has a first crystal phase consisting essentially of $SrZrO_3$ as a primary component and contains Ru, and
   wherein the complex oxide further has a second crystal phase containing $SrCeO_3$ as a primary component.
2. The hydrocarbon reforming catalyst according to claim 1, wherein the molar ratio of Ru to Sr is 0.01 to 0.38.
3. The hydrocarbon reforming catalyst according to claim 1, wherein the complex oxide further contains Y.
4. The hydrocarbon reforming catalyst according to claim 3, wherein the molar ratio of Y to Ce is 0.6 or less.
5. A hydrocarbon reforming catalyst comprising:
a complex oxide having a perovskite structure,
   wherein the complex oxide has a first crystal phase containing $SrZrO_3$ as a primary component and contains Ru,
   wherein the complex oxide further has a second crystal phase containing $SrCeO_3$ as a primary component, and
   wherein the complex oxide does not contain Y.
6. A hydrocarbon reforming apparatus comprising:
a pipe through which a treatment object gas containing at least a hydrocarbon passes; and a hydrocarbon reforming catalyst disposed at a position to contact the treatment object gas inside the pipe, the hydrocarbon reforming catalyst comprising a complex oxide having a perovskite structure, wherein the complex oxide has a first crystal phase consisting essentially of $SrZrO_3$ as a primary component and contains Ru.
7. The hydrocarbon reforming apparatus according to claim 6, wherein the molar ratio of Ru to Sr in the complex oxide is 0.01 to 0.38.
8. The hydrocarbon reforming apparatus according to claim 6, wherein the complex oxide further has a second crystal phase containing $SrCeO_3$ as a primary component.
9. The hydrocarbon reforming apparatus according to claim 8, wherein the complex oxide further contains Y.
10. The hydrocarbon reforming apparatus according to claim 9, wherein the molar ratio of Y to Ce in the complex oxide is 0.6 or less.
11. A hydrocarbon reforming comprising:
a pipe through which a treatment object gas containing at least a hydrocarbon passes; and
the hydrocarbon reforming catalyst according to claim 5 disposed at a position to contact the treatment object gas inside the pipe.
12. The hydrocarbon reforming apparatus according to claim 6, wherein the complex oxide further contains Y but does not contain Ce.
13. The hydrocarbon reforming apparatus according to claim 6, wherein the complex oxide further contains at least one of Ce and Y.

* * * * *